(12) United States Patent
Bohm et al.

(10) Patent No.: US 8,976,961 B2
(45) Date of Patent: Mar. 10, 2015

(54) ENCRYPTION TOPOLOGY FOR TRANSPORTING MULTIPLE AV STREAMS OVER A UNIFIED MEDIUM

(75) Inventors: Christian Willibald Bohm, Rattenberg (DE); Peter Hall, Munich (DE)

(73) Assignee: Analog Devices, Inc., Norwood, MA (US)

( * ) Notice: Subject to any disclaimer, the term of this patent is extended or adjusted under 35 U.S.C. 154(b) by 153 days.

(21) Appl. No.: 13/083,943

(22) Filed: Apr. 11, 2011

(65) Prior Publication Data

US 2012/0257750 A1    Oct. 11, 2012

(51) Int. Cl.
| | |
|---|---|
| H04N 7/167 | (2011.01) |
| H04N 21/414 | (2011.01) |
| H04N 21/4367 | (2011.01) |
| H04J 11/00 | (2006.01) |
| G06F 1/26 | (2006.01) |
| G06F 11/00 | (2006.01) |
| G08B 13/00 | (2006.01) |
| G08B 29/00 | (2006.01) |
| H04N 21/2347 | (2011.01) |
| H04N 21/4405 | (2011.01) |

(52) U.S. Cl.
CPC ..... *H04N 21/41422* (2013.01); *H04N 21/4367* (2013.01); *H04N 21/2347* (2013.01); *H04N 21/4405* (2013.01)
USPC .............................. 380/212; 370/210; 726/36

(58) Field of Classification Search
USPC ........................... 380/212, 200, 10, 210, 201; 713/160–161, 168–174, 182–186, 202; 345/204, 1; 705/51, 54; 709/206, 225, 709/229, 249, 389; 726/2–8
See application file for complete search history.

(56) References Cited

U.S. PATENT DOCUMENTS

| 7,310,422 | B2 * | 12/2007 | Candelore et al. ............ 380/200 |
|---|---|---|---|
| 7,903,815 | B2 | 3/2011 | Bacon et al. |
| 2006/0053441 | A1 * | 3/2006 | Walker .............................. 725/30 |
| 2007/0154018 | A1 * | 7/2007 | Watanabe ....................... 380/273 |
| 2007/0242062 | A1 * | 10/2007 | Guo et al. ....................... 345/204 |
| 2007/0297612 | A1 * | 12/2007 | Feder et al. .................... 380/270 |
| 2009/0278763 | A1 | 11/2009 | Zeng et al. |
| 2012/0173877 | A1 * | 7/2012 | Pendakur et al. ............. 713/169 |

FOREIGN PATENT DOCUMENTS

WO    2012/033707 A1    3/2012

OTHER PUBLICATIONS

PCT International Search Report for PCT/US12/27661 mailed on Jun. 8, 2012.

* cited by examiner

*Primary Examiner* — Evans Desrosiers
(74) *Attorney, Agent, or Firm* — Kenyon & Kenyon, LLP (57) ABSTRACT

A system architecture allows for the transmission of multiple HDCP encrypted audio/video streams over a single unified cable to multiple receivers using a daisy chain topology. Each individual audio/video stream is first encrypted and then combined into a uniform stream, and the uniform stream is transmitted to each of the receivers. Each receiver contains a decryption engine that operates independently of the engines in the other receivers, therefore allowing each receiver to select to a unique channel and decrypt and display one of the audio/video streams.

27 Claims, 6 Drawing Sheets

ENCRYPTION TOPOLOGY FOR TRANSPORTING MULTIPLE AV STREAMS OVER A UNIFIED MEDIUM

FIELD OF THE INVENTION

The present invention relates to the transmission of audio and video streams over serial transports. The present invention further relates to a method for transmitting multiple HDCP encrypted streams over a unified cable arranged in a daisy chain topology. The present invention further relates to an architecture for daisy chain nodes to transport encrypted audio/video streams on a single cable in an automotive vehicle.

BACKGROUND INFORMATION

The distribution of audio and video ("AV") content in motor vehicles is an emerging market. The manufacturing of modern motor vehicles has included such features as rear seat entertainment systems which can display high-definition formats to vehicle occupants. These entertainment systems allow for an occupant to view navigational data as well as watch broadcast or cinematic programming. An occupant can watch commercially available content on entertainment systems from connected electronic devices, including blu-ray players, which can display various formats such as 1080p to the viewer. Connecting an entertainment system to a high definition device, such as blu-ray player, requires a suitable connection, which can support the transmission of the uncompressed digital data.

The transmission of high definition content, in particular high definition content on commercially distributed materials, is regulated in an effort to prevent piracy of the materials. Encryption of the high definition content transmitted from the commercial materials allows for the prevention of unlawful distribution of those commercial materials. Content encrypted from the materials cannot be freely copied and distributed. Digital copyright protection systems prevent a copyrighted work from displaying on a device that does not support the copyright protection system. For the transmission of high definition content, the standard used is known as high-bandwidth digital copyright protection ("HDCP"). Manufacturers who wish to display high definition content on their device, may obtain a license that unlocks and allows the high definition content to display on the device. HDCP restricts the transmission of HDCP encrypted content and prevents that content from playing on an unlicensed device that does not support HDCP.

One significant characteristic of the HDCP 1.X standard (including HDCP standards 1.0 and 1.4), is that while it allows for the transmission of the encrypted content, it does not allow the transmission to be of a 'broadcast' type. HDCP 1.X supported device transmitters must connect to each respective HDCP receiver via a point-to-point link. If more than one audio/video receiver (display) is to be connected to a transmitter, a HDCP repeater must be implemented. This repeater consists of a HDCP receiver which decrypts the audio/video content and a set of one or more transmitters which re-encrypt and transmit the audio/video content again. This breaks the tree structure of a broadcast system into a set of point-to-point links. The HDCP repeaters at the tree nodes are expensive to implement. They typically include a microcontroller subsystem running software to handle the communication between upstream and downstream point-to-point links. In some applications (e.g. the automotive case) it may be highly undesirable to have a need for 'intelligent' nodes at remote locations of an audio/video distribution network. Instead, there is a strong desire to centralize all software execution in one spot, typically at the top of the audio/video distribution tree where a powerful processor already resides.

Figure 1:
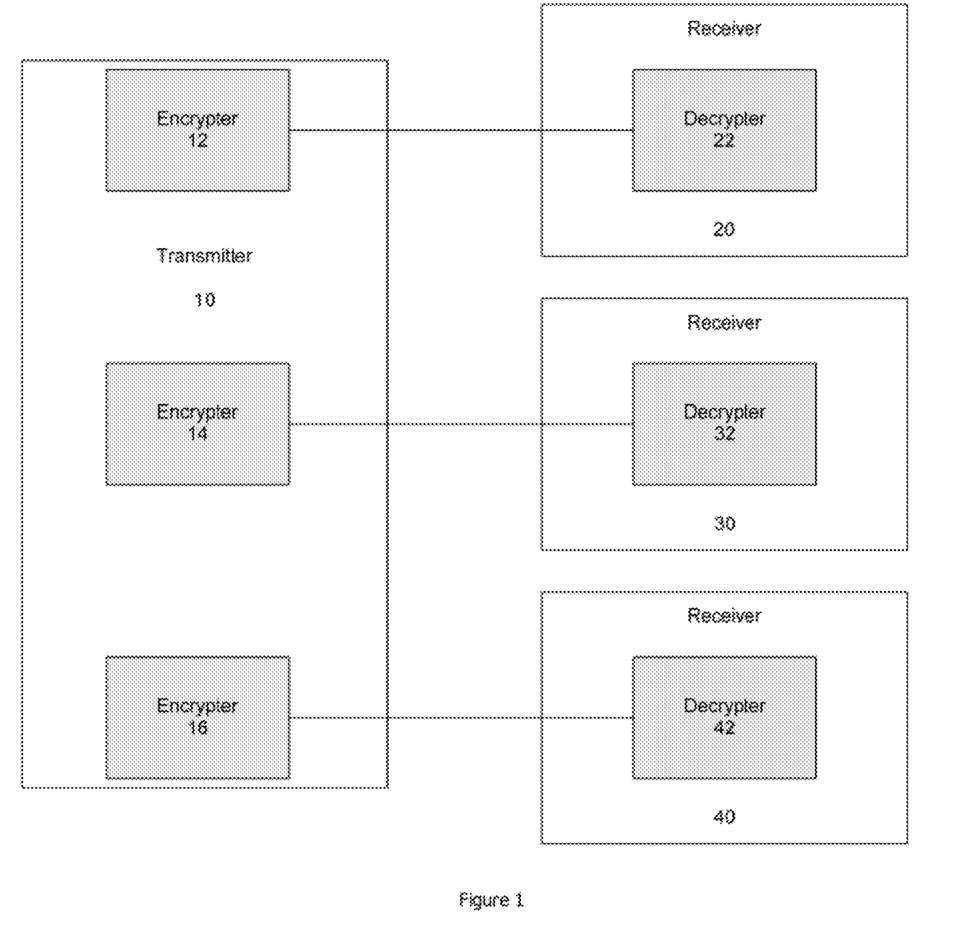
FIG. 1 is a diagram of an architecture with a set of transmitters in an audio/video source connected to individual receivers via individual cables.

A point-to-point link can be establish to separately connect each of the individual rear display monitors directly to the transmitter, as illustrated in FIG. 1. In FIG. 1, each of the cables can be driven by its own built-in encryption engine 12, 14, and 16, in transmitter 10, and each of the displays monitors 20, 30, and 40 can separately decrypt the HDCP encrypted content through decryption engines 22, 32, and 42, to display the content on the individual display monitor. However, the usage of separate individual cables to accomplish the transmission to multiple receivers or display monitors creates additional weight in the vehicle, and is not cost effective to implement.

One way to overcome the need for separate point-to-point connection cables is to merge the unencrypted audio/video streams into a single unified stream. The single stream is then encrypted resulting in a single unified encryption stream ("UES"). The UES is transmitted to a receiver which decrypts the entire UES before separating the UES into individual audio/video streams. Because decryption occurs for the entire UES instead of the individual audio/video streams, a single set of keys are used to encrypt and decrypt all of the audio/video streams, and the audio/video streams are protected by one set of encryption and decryption engines.

Figure 2:
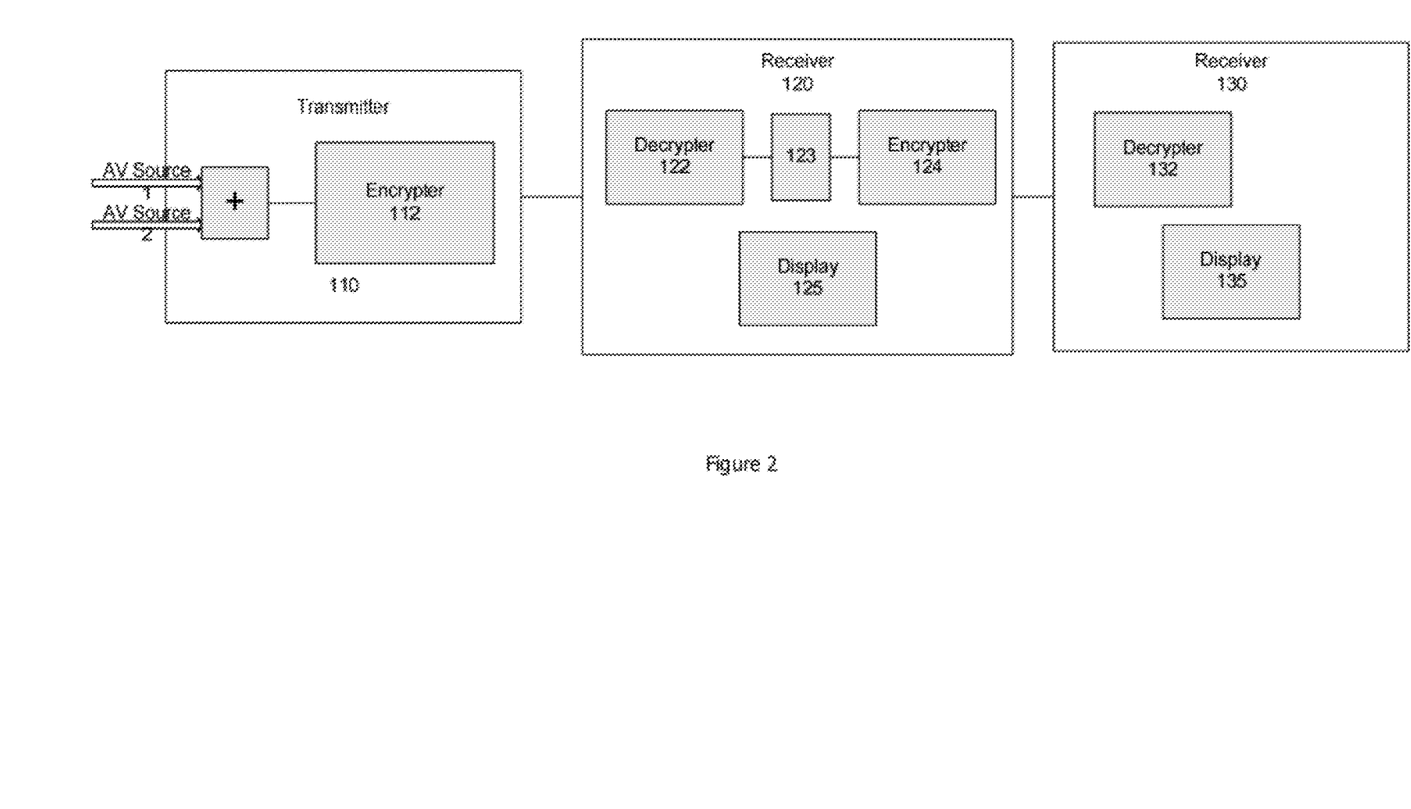
FIG. 2 is a diagram of a transmitter connected to receivers through a daisy chain using HDCP repeaters.

A system using a daisy chain topology for transmitting a UES is illustrated in FIG. 2. In motor vehicle design, using a daisy chain to connect multiple outputs devices to a transmitter is preferable because it drastically reduces the amount of cable used, and subsequently the cost and weight of the cable. The displays, as depicted in FIG. 2, are connected in a daisy chaining fashion. In transmitter 110, multiple audio/video streams are combined in an adder and fed to encrypter 112, where encrypter 112 encrypts the combined stream into a UES and sends the UES via a cable to the first of the receivers. The first receiver 120 receives the UES and decrypts it via a decryption engine 122. One of the audio/video streams is displayed on the display 125 in receiver 120. The UES is sent through HDCP repeater 123 and re-encrypted through encrypter 124 and transmitted from the first receiver to a subsequent display or receiver. At the second receiver 130, the UES is decrypted by decryption engine 132 and one of the audio/video streams is displayed locally at display 135. The UES may again be encrypted by encryption engine 134 and transmitted to a subsequent display or receiver. This process is repeated for the remaining display monitors.

The described daisy-chain of displays depicted in FIG. 2, must use HDCP Repeaters, such as repeater 123, in each daisy chain node. Since the primary audio/video sources and the transmitter must be aware of all connected audio/video sinks subsequently attached to it, a HDCP repeater must be employed to collect downstream information from a daisy chain connection and transmit it upstream towards the transmitter. Each intermediate node passes information of the subsequently connected downstream receivers or displays, topology, or public keys, back to the previously node, and eventually back to the audio/video source. This requires the presence of a microprocessor and a memory at each intermediate node, i.e display monitor or receiver. Implementing microprocessors and the corresponding software in each of the display units adds significantly to the cost and complexity of the overall of the system. The cost saved by reducing the cable length is outweighed by the additional cost of the additional microprocessors in each of the display monitors.

Implementing daisy chains to transmit the HDCP encrypted content can also be problematic in the event the encryption system fails. Because the streams have to be decrypted at each intermediate node, and re-encrypted for streams transmitted to subsequently connected display monitors or receivers, if the re-encryption of the streams fails at any of the nodes, all subsequently connected nodes will be affected. Therefore, the failure of the encryption engine at any of the connected display monitors prevents the decryption and display of the remaining audio/video streams at the subsequently connected display monitors or receivers.

Thus there remains a need in the art, for a cost effective architecture which allows for the daisy chaining of connected display monitors or receivers to a HDCP 1.X audio/video transmitter, without the use of HDCP repeaters on nodes of the intermediates nodes, which maximizes efficiency and minimizes area.

DETAILED DESCRIPTION

The subject invention will now be described in detail for specific preferred embodiments of the invention, it being understood that these embodiments are intended only as illustrative examples and the invention is not to be limited thereto.

Transmitting multiple HDCP encrypted audio/video streams over a single unified cable may be arranged in a daisy chain topology without the use of HDCP repeaters at each daisy chain node. Embodiments of the present invention provide a primary HDCP transmitter establishing virtual point-to-point links with each node in the daisy chain configuration. Each audio/video stream received by the transmitter is encrypted separately before being combined into a unified stream and transmitted. Each separately encrypted audio/video stream in the unified audio/video stream may only be decrypted once, where decryption of the individual stream occurs at a corresponding receiver or display monitor. Each of the receivers may contain a decryption engine that operates independently of engines in the other receivers, thus making the primary HDCP transmitter aware of all connected downstream audio/video sink devices.

Figure 3:
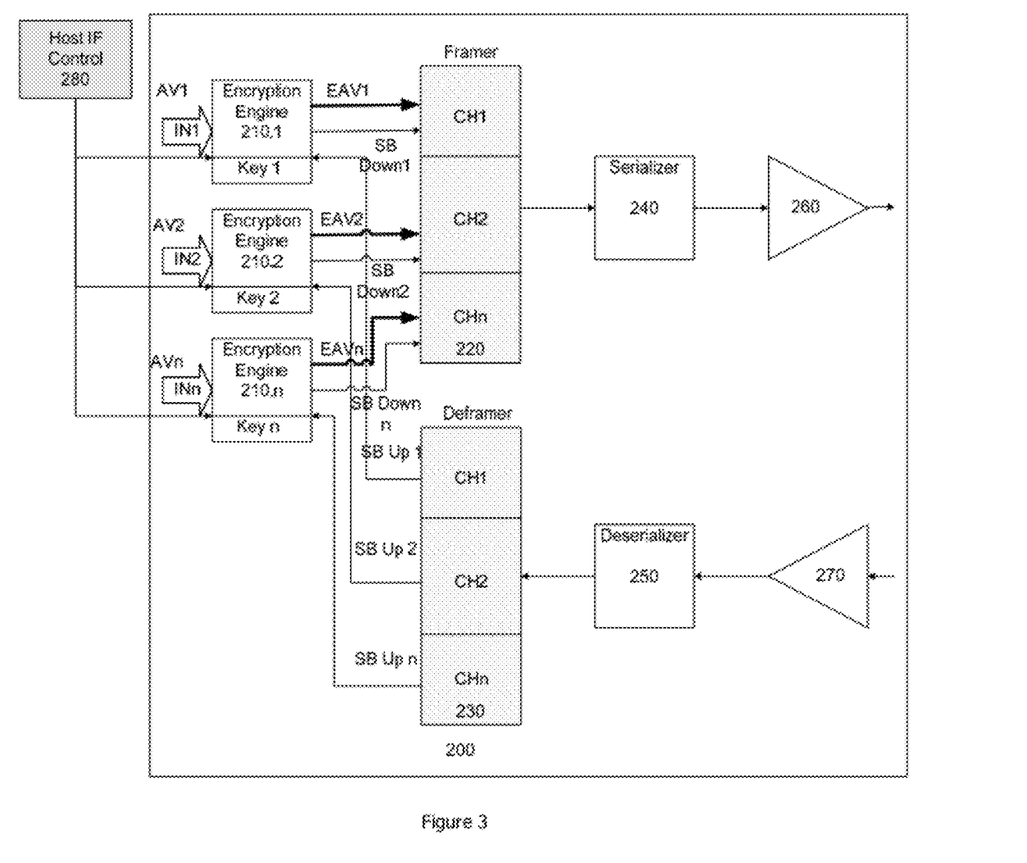
FIG. 3 is a diagram of a transmitter in the audio/video source that encrypts and combines the audio/video streams, according the present invention.

FIG. 3 illustrates a diagram of a transmitter in a HDCP compatible audio/video source of the present invention. Transmitter 200 may be embedded in a audio/video source device that may be compatible to HDCP1.X. In an alternative embodiment, transmitter 200 may be housed outside any audio/video source and may receive audio/video streams from one or more HDCP compatible audio/video sources. In an embodiment, the audio/video source devices may be located in the front of the vehicle.

Transmitter 200 may house a plurality of encryption engines 210.1-210.$n$. Each encryption engine may include its own separate set of keys. When multiple audio/video streams are input to transmitter 200, each individual audio/video stream, AV1-AVn, may be fed to a respective encryption engine 210.1-210.$n$. Auxiliary signals not corresponding to the audio/video streams, may also be fed to the encryption engines 210.1-210.$n$ through auxiliary lines (not pictured). These auxiliary signals may include timing signals, synchronization signals, or other data signals that may be relevant to an input audio/video stream.

A host control interface 280 which may selectably control the encryption engines 210.1-210.$n$ may be located near transmitter 200. The host control interface 280 may allow for the initialization and setting of the parameters of encryption engines 210.1-210.$n$. Host control interface 280 may emit a control signal to enable or disable encryption engines 210.1-210.$n$. Host control interface 280 may also check the encryption status of an input audio/video stream. As each of the encryption engines 210.1-210.$n$ may operate independently of the other encryption engines, interface 280 may synchronize the encryption engines to work simultaneously, or may selectively shut down one or more of the encryption engines while other encryption engines remain operating. This may allow for the host control interface 280 to set a configuration where various encryption engines may be disabled. Host control interface 280 may also set an encryption algorithm to be used. In an embodiment, the encryption algorithm may be an algorithm corresponding to HDCP 1.X.

Each encryption engine may also output an unencrypted side band communication stream. These output side band streams may be downstream communication to connected receivers to convey control data from the encryption engines. The side band streams may exchange public keys with the receivers or verify the integrity of the connection with the encryption engine. Each side band communication stream may be coupled with the encrypted audio/video stream from the respective encryption engine, and is output to the corresponding receiver for which the accompanying encrypted audio/video stream is decrypted and displayed on.

Transmitter 200 may also include a framer 220. Framer 220 may include a plurality of channels, Ch1-Chn. Each of the channels in framer 220 may correspond to a respective encryption engine. In an embodiment, the number of channels in framer 220 may be equal to the number of encryption engines. Each of the channels in framer 220 may receive an encrypted audio/video stream from a respective encryption engine. Framer 220 may combine individual encrypted audio/video streams into a single uniform stream. In an embodiment framer 220 may be a multiplexer.

In an example embodiment, framer 220 may use a round-robin technique to sort and combine the individual streams into a uniform stream. In this embodiment, individual streams may be sorted and combined by channel, with the encrypted audio/video stream in the subsequent channel being added next. In an alternative embodiment, framer 220 may use a priority driven algorithm to sort and combine the individual encrypted audio/video streams according to an assigned priority. In such an embodiment, encrypted audio/video streams that have been assigned a higher priority may be sorted and combined first. An example of a priority classification may be the proximity of the nodes to the HDCP transmitter. A stream that is to be decrypted and displayed at an immediate node may be assigned the highest priority. The next highest priority may be assigned to the audio/video stream that is to be decrypted and displayed at the next receiver or display monitor. Subsequent priorities for the remaining encrypted audio/video streams may be assigned in this manner.

Framer 220 may also receive side band communication streams, SB Down 1-SB Down n, from the encryption engines 210.1-210.n. Each of the channels in framer 220 may receive a side band communication stream from the same respective encryption engine that output the encrypted audio/video stream to the respective channel.

Transmitter 200 may house serializer 240. Serializer 240 may convert the combined encrypted stream into a format that may be transmitted across transmission line and reread and formatted by a receiver. Buffer 260 may also be included in transmitter 200. Buffer 260 may be a physical transport interface to feed the uniform encrypted stream to a receiver. Transport mechanism for physical transport may include wire solutions, wireless transmission, optical connections, or any other means to transmit the combined encrypted. In an embodiment, the transport mechanism may a twisted cable.

Control data may also be sent from a corresponding receiver back to the transmitter. Transmitter 200 may include buffer 270 which may receive upstream side band communication streams from the receivers. Transmitter 200 may also include deserializer 250. The upstream side band communication stream may have been formatted in the sending receiver and deserializer 250 may reformat the transmitted data back into a uniform stream.

Transmitter 200 may include a deframer 230. Deframer 230 may include a plurality of channels, Ch1-Chn. In an embodiment deframer 230 may be a demultiplexer. Deframer 230 may separate the uniform stream into individual upstream side band communication streams corresponding to control data. Each of the channels in deframer 230 may correspond to a respective encryption engine and may output a upstream side band communication stream to the respective encryption engine. In an embodiment, the number of channels in deframer 230 may be equal to the number of encryption engines.

During operation, audio/video streams AV1-AVn may be applied to encryption engines 210.1-210.n. Each of the audio/video streams AV1-AVn may be separately tagged and encrypted by the respective encryption engine. Each encryption engine may encrypt the respective audio/video stream using separate and individual private keys contained by the encryption engine. The encrypted audio/video streams EAV1-EAVn may be output to a respective channel in framer 220.

Each of the encryption engines 210.1-210.n may also output a downstream side band communication stream to a respective channel in framer 220, with the downstream side band communication stream eventually being received by a designated receiver. The respective downstream side band communication stream may carry control data that must be transmitted from the respective encryption engine to one of the decryption engines in the designated receiver. The transmission of the downstream side band communication stream may allow for the exchange of public keys from the respective encryption engine to the corresponding decryption engine.

The encrypted data/video streams and the downstream side band communication streams may be combined into a single merged pre-encrypted stream ("MPES"). The MPES may be arranged based on the round-robin or priority technique described above. The MPES may contain the input streams to framer 220 in a manner that allows for separation of the signals at the respective receivers. Framer 220 may output the MPES to serializer 240.

Serializer 240 may convert the MPES into an appropriate format for transmission and output the MPES to buffer 260. Buffer 260 may feed the uniform encrypted stream to a receiver via the selected transport mechanism.

Figure 4:
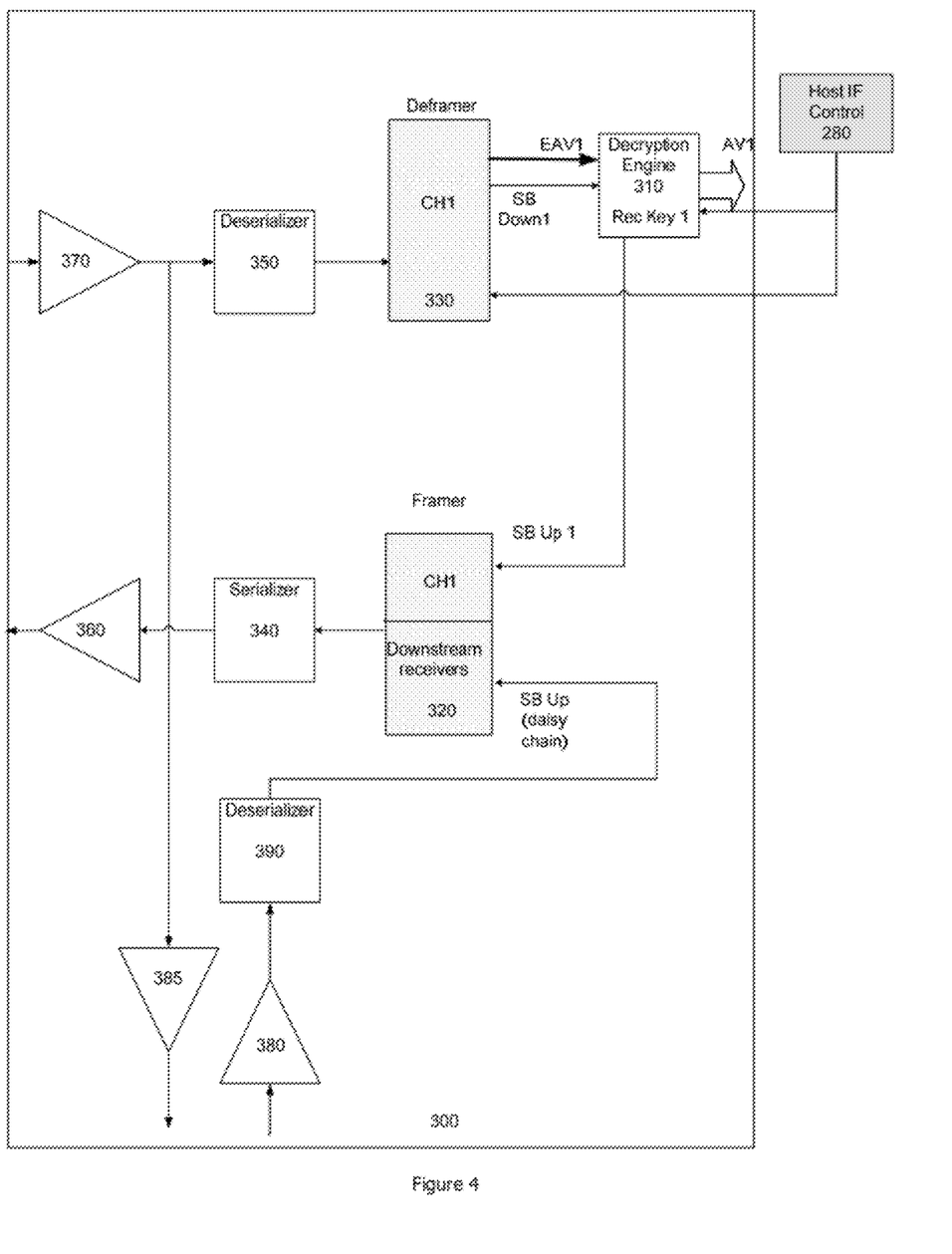
FIG. 4 is a diagram of a receiver that decrypts and separates the audio/video streams, according the present invention.

FIG. 4 illustrates a diagram of a receiver of the present invention. In an embodiment, the receiver may be a transceiver. In an embodiment the receiver may be a display monitor.

FIG. 4 illustrates a first receiver at the first node in the daisy chain, but may also represent subsequent receivers in subsequent nodes in the daisy chain. Receiver 300 may house buffer 370 that may be a physical transport interface. In the first receiver, buffer 370 may receive a formatted version of the MPES from transmitter 200. In subsequently connected receivers in the daisy chain, buffer 370 may receive the formatted version of MPES from buffer 385 of the preceding receiver in the daisy chain. The output of buffer 370 may be connected to the input of buffer 385. Buffer 385 may output the formatted version of the MPES from receiver 300 to the next receiver in the daisy chain. The output of buffer 370 may also be connected to deserializer 350. The MPES may have been formatted in transmitter 200 and deserializer 350 may recreate the MPES in a digital form.

Receiver 300 may include a deframer 330. Deframer 330 may include only a single channel. In a first receiver, that channel may be Ch1. Deframer 330 may divide the merged encrypted audio/video streams into separate data paths. The respective encrypted audio/video stream that is to be displayed on receiver 300 may be stored on the channel in deframer 330. The stored encrypted audio/video stream may be output to decryption engine 310. None of the other encrypted audio/video streams may be stored on deframer 330, and as a result, may not be decrypted locally. Decryption engine 310 may contain its own set of decryption keys and may use this set of keys to decrypt the stored encrypted audio/video stream. The decryption engine 310 may use the same encryption algorithm used by the respective encryption engine 210.1-210.n to undo the encryption done by the respective encryption engine.

A respective side band downstream communication stream, SB Down1 as illustrated in FIG. 4, may also be transmitted to the decryption engine 310. This side band downstream communication stream may share public keys or control data with the decryption engine 310 from the respective encryption engine that encrypted the audio/video stream. The side band downstream communication stream may be separated from the MPES by defamer 330 and output to the decryption engine 310.

Host control interface 280 may selectably control deframer 330 and decryption engine 310. The host control interface 280 may allow for the initialization and setting of the parameters of decryption engine 310 and may emit a control signal to enable or disable decryption engine 310. Host control interface 280 may also check the decryption status of an input encrypted audio/video stream to decryption engine 310.

Receiver 300 may also include buffer 380 and deserializer 390. If the respective receiver is the last receiver in the daisy chain node, buffer 380 and deserializer 390 may not be present. Incoming upstream side band communication streams may be received from subsequent receivers in the daisy chain receivers to receiver 300 through buffer 380. These incoming upstream side band communication streams may convey control data from the decryption engines in the downstream receivers back to the encryption engines in transmitter 200. The side band streams may exchange public keys with the transmitter or verify the integrity of the connection with the decryption engines of the respective receiver.

Deserializer 390 may reformat the upstream side band communication streams, which may have been formatted in the sending receiver. The reformatted upstream side band communications streams may be output to respective channels in framer 320.

Framer 320 may include a channel corresponding to the respective audio/video stream being output by the respective receiver and an additional channel for the upstream side band communication streams received from deserializer 390. Framer 320 may combine the upstream side band communication stream from the given receiver with the upstream side band communication streams from the downstream receivers into a single stream. Framer 320 may be coupled to serializer 340.

Receiver 300 may include serializer 240. Serializer 340 may convert the combined upstream communication streams into a format that may be transmitted across the transport mechanism formatted by a preceding receiver or transmitter 200. Buffer 360 may also be included in receiver 300 and may be a physical transport interface to feed the combined upstream side band communication streams to a preceding receiver or transmitter 200. If the respective receiver is the first receiver, buffer 360 may feed the upstream side band communications streams back to transmitter 200. If the respective receiver is not the first receiver, but a subsequent receiver in the daisy chain, buffer 360 may feed the upstream side band communications streams back to buffer 380 in the preceding receiver.

During operation, a formatted version of the MPES may be applied to buffer 370. The buffer may output the formatted MPES to buffer 385 where the entire MPES may be fed to a next receiver. The MPES may also be fed to deserializer 360 which redigitizes the MPES and outputs the MPES to deframer 330. Deframer 330 may divide the MPES and pick up one of the encrypted audio/video streams to be decrypted locally in the receiver. This encrypted audio/video stream, EAV1, may be output from deframer 330 to decryption engine 310. Deframer 330 may also output the downstream side band communication stream, SB Down1, to decryption engine 310. The downstream side band communication stream may correspond to control data and public keys outputted from the respective encryption engine that encrypted EAV1 to decryption engine 310.

Decryption engine 310 may decrypt encrypted audio/video stream EAV1 using its set of private keys and the same encryption algorithm used to encrypt AV1, and output the audio/video stream for display. If an auxiliary stream is also present, that auxiliary stream may also be outputted (not pictured). Decryption engine 310 may also output an upstream side band communication stream, SB UP1 to framer 320, which may convey control data from decryption engine 310 back to transmitter 200. Deframer 300 may combine the upstream side band communication stream from decryption engine 310 with incoming upstream side band communication streams from preceding receivers in the daisy chain from buffer 380 and output this combined stream to serializer 340. Serializer 340 may convert the combined stream into a format that may be transmitted and may output this formatted stream to buffer 360. Buffer 360 may feed the combined stream to transmitter 200 if the receiver is the first receiver in the daisy chain or to the preceding receiver if the receiver is a subsequent receiver in the daisy chain.

Figure 5A:
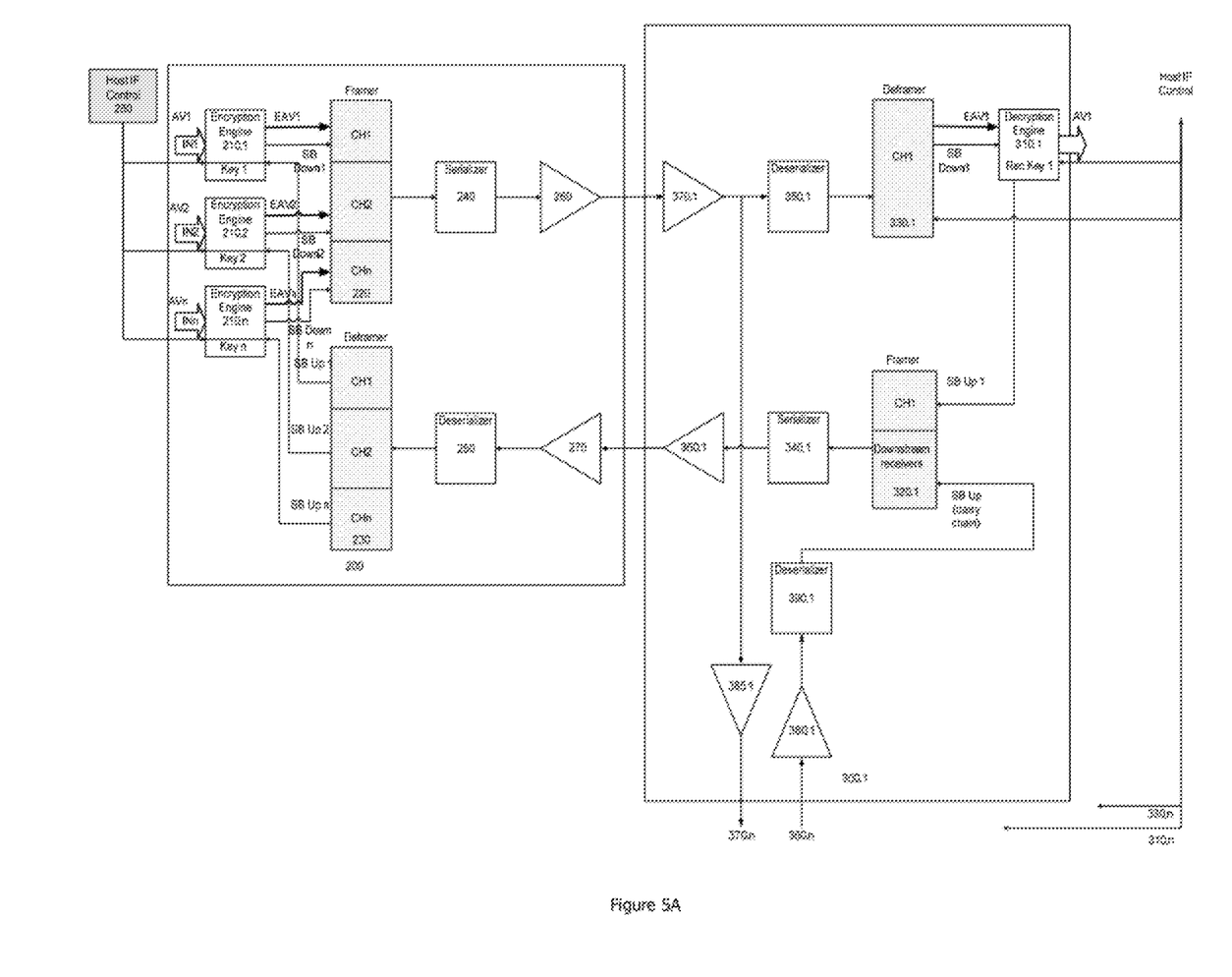
FIG. 5 is a diagram of an architecture transmitter and a receiver connected in a daisy chain topology, according to the present invention.
Figure 5B:
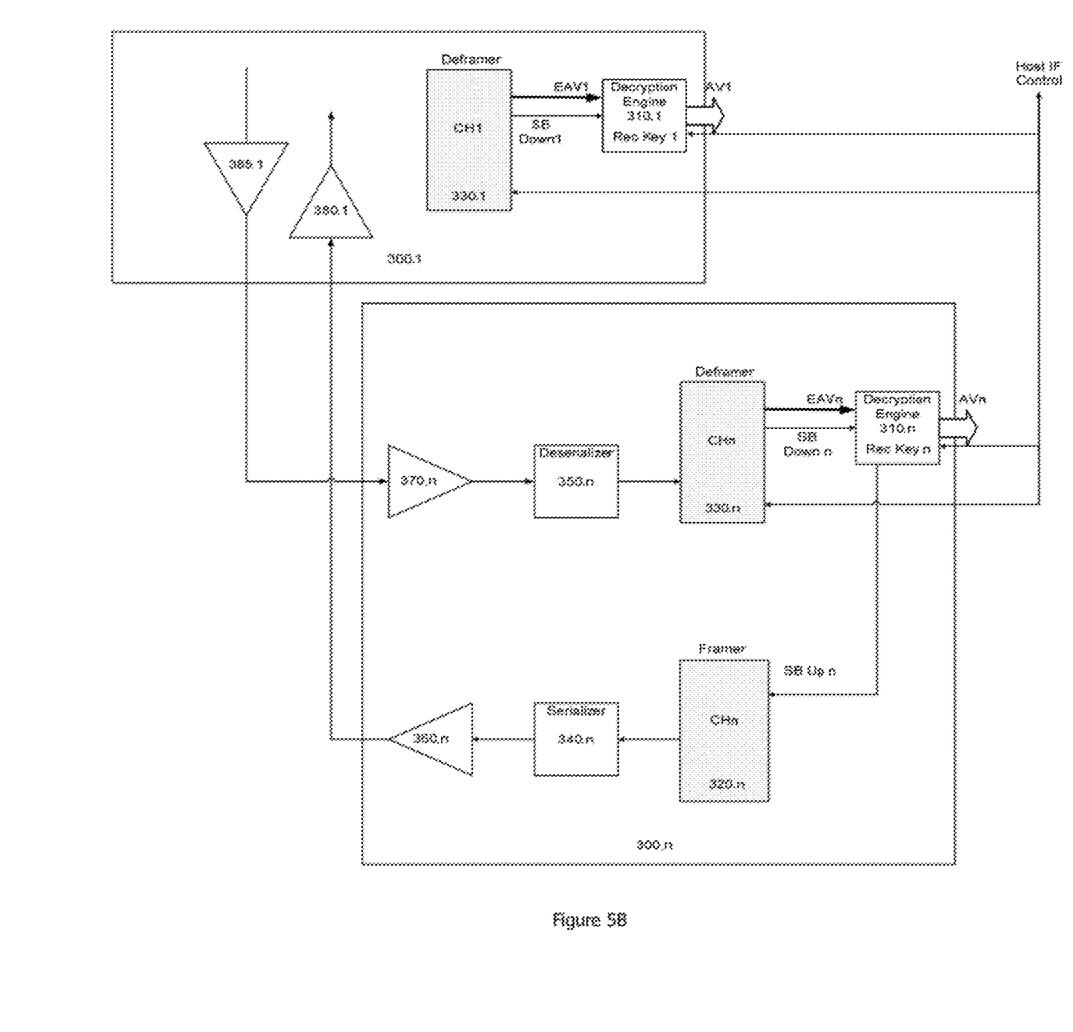

FIG. 5 illustrates a diagram of an architecture where a transmitter and connected receivers are connected in a daisy chain topology, according to the present invention. FIG. 5 illustrates a first receiver 300.1 at the first node in the daisy chain, which may be connected directly to transmitter 200. Receiver 300.1 may also be coupled to a next receiver in the daisy chain, receiver 300.n as illustrated in FIG. 5. As illustrated in FIG. 5, receiver 300.n may be the last receiver in the daisy chain. In other embodiments, there exists a number of receivers in the daisy chain that are coupled between receiver 300.1 and receiver 300.n.

The input of buffer 370.1 in receiver 300.1 may be coupled to the output of buffer 260 in transmitter 200. The output of buffer 360.n in receiver 300.1 may be coupled to the input of buffer 270. The input of buffer 370.n in receiver 300.n may be coupled to the output of 385.1, and the output of buffer 360.n in receiver 300.n may be coupled to the input of buffer 380.1. Both the decryption engines 310.1 and 310.n, and the deframers 330.1 and 330.n, may be selectably controlled by host control interface 280.

During operation, the MPES may be transmitted across a twisted cable or other transport mechanism from transmitter 200 to a first receiver 300.1. The MPES may be fed to receiver 300.1 from buffer 260 and may be received in the receiver by buffer 370.1. Buffer 370.1 may output the MPES to the deserializer 350.1 and deframer 330.1 to pick up one of the encrypted audio/video streams which may be displayed after being decoded by decryption engine 310.1. Receiver 300.1 may be programmed to pick up a designated encrypted audio/video stream from the MPES. Receiver 300.1 may not pick up any of the other encrypted audio/video streams from MPES and a security mechanism may be implemented to ensure that receiver 300.1 picks up a unique channel from the other receivers. Multiple receivers in the daisy chain may not pick up the same channel, therefore each encrypted audio/video stream may only be decrypted and displayed by one dedicated receiver. This may ensure a defined one-to-one assignment between any one particular channel in transmitter 200 and a receiver in the daisy chain, establishing a point-to-point connection between transmitter 200 and each of the connected receivers in the daisy chain.

The MPES may be outputted from buffer 370.1 to receiver 300.n through buffer 385.1. The MPES may be received in receiver 300.n by buffer 370.n. Buffer 370.1 may output the MPES to the deserializer 350.n and deframer 330.n to pick up one of the encrypted audio/video streams which may be displayed after being decoded by decryption engine 310.n. Receiver 300.n may also be programmed to pick up a designated encrypted audio/video stream from the MPES and not pick up any of the other encrypted channels designated in the preceding receivers in the daisy chain.

Decryption engine 310.n may output an upstream side band communication stream, SB UP n, to framer 320.n, which may be output the communication stream to the preceding receiver, receiver 300.1 in FIG. 5, through serializer 340.n and buffer 360.n. Receiver 300.1 may receive all of the upstream side band communication streams from the subsequent receivers in the daisy chain through buffer 360.1 and deserializer 360.n. Framer 320.1 may combine the incoming upstream side band communications streams with upstream side band stream from decryption engine 310.1 and output the combined stream back to transmitter 200, through serializer 340.1 and buffer 360.1. The combined side band stream may be fed to transmitter 300.1 from buffer 360.1 and may be received in the transmitter by buffer 270. The combined side band stream may be separated into individual streams and each individual upstream side band communication stream may be sent to a respective encryption engine to convey control data and license key information from the respective receiver.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A system that enables point-to-point transmission of multiple encrypted streams using a daisy chain topology, the system comprising:
   a transmitter to generate and transmit a merged encrypted stream over a first cable portion, the transmitter including:
      a plurality of encryption engines to encrypt a plurality of audio/video streams using a plurality of keys, each encryption engine fully encrypting a different respective single one of the plurality of audio/video streams;
      a framer to receive the plurality of encrypted audio/video streams from the plurality of encryption engines and combine the plurality of encrypted audio/video streams into the merged encrypted stream; and
      an output buffer to output the merged encrypted stream onto a first cable portion;
   a first receiver, coupled to the transmitter via the first cable portion, to receive the merged encrypted stream from the transmitter and transmit the merged encrypted stream over a second cable portion, the first receiver including:
      an input buffer to receive the merged encrypted stream from the first cable portion;
      a deframer to select and output only one of the plurality of encrypted audio/video streams from the merged encrypted stream;
      a decryption engine to decrypt only the selected one of the encrypted audio/video streams for display; and
   at least one additional receiver, coupled to the first receiver by the second cable portion and including an additional decryption engine, to receive the merged encrypted stream from the first receiver and select and decrypt only a different one of the plurality of encrypted audio/video streams from the merged encrypted stream for display.

2. The system according to claim 1, wherein the at least one additional receiver includes an additional deframer to select only the different one of the plurality of encrypted audio/video streams from the merged encrypted stream.

3. The system according to claim 1, wherein the at least one additional receiver includes an additional decryption engine to decrypt the different encrypted audio/video stream.

4. The system according to claim 3, wherein the at least one additional receiver outputs an upstream side band stream from the additional decryption engine to the first receiver.

5. The system according to claim 4, wherein the first receiver-includes an additional framer to combine an upstream side band stream from the decryption engine of the first receiver with the incoming upstream side band stream from the at least one additional receiver into a combined upstream side band stream, and the first receiver outputs the combined upstream side band stream to the transmitter.

6. The system according to claim 5, wherein the transmitter includes another deframer to separate the combined upstream side band stream into individual upstream side band streams that are provided to the plurality of encryption engines.

7. The system according to claim 3, wherein the plurality of encryption engines output downstream side band streams, one of the downstream side band streams being transmitted to the decryption engine of the first receiver.

8. The system according to claim 7, wherein another one of the downstream side band streams is transmitted to the additional decryption engine of the at least one additional receiver.

9. The system according to claim 1, further comprising another receiver coupled to the at least one additional receiver in the daisy chain topology, wherein the another receiver receives the merged encrypted stream from the at least one additional receiver.

10. The system according to claim 1, wherein the transmitter is situated in a high-bandwidth digital content protection (HDCP) compatible audio/video source.

11. The system according to claim 1, further comprising a controller to generate and send control signals to the transmitter and transceiver to:
   configure each of the plurality of encryption and decryption engines to use a respective single one of the plurality of keys; and
   selectively enable and disable operation of each of the plurality of encryption and decryption engines.

12. The system according to claim 1, wherein the plurality of encryption engines receive the plurality of audio/video streams from a plurality of different audio/video sources.

13. The system according to claim 1, wherein the first receiver includes only a single decryption engine.

14. The system according to claim 1, wherein each of the plurality of encrypted audio/video streams is decrypted by only a respective one of the first receiver or the at least one additional receiver.

15. A method for point-to-point transmission of multiple encrypted streams using a daisy chain topology, the method comprising:
   encrypting a plurality of audio/video streams with a plurality of encryption engines, each encryption engine fully encrypting a different respective single one of the plurality of audio/video streams;
   combining the plurality of encrypted audio/video streams into a merged encrypted stream with a framer;
   outputting the merged encrypted stream across a cable by an output buffer of a transmitter to a first receiver;
   receiving the merged encrypted stream from the first cable portion by an input buffer of the first receiver;
   transmitting the merged encrypted stream to at least one additional receiver from the first receiver;
   selecting only one of the plurality of encrypted audio/video streams from the merged encrypted stream at the first receiver;
   decrypting only the selected encrypted audio/video stream by a decryption engine in the first receiver for display;
   selecting only a different one of the plurality of encrypted audio/video streams from the merged encrypted stream at the at least one additional receiver; and
   decrypting only the selected different encrypted audio/video stream by an additional decryption engine in the at least one additional receiver for display.

16. The method according to claim 15, further comprising transmitting the merged encrypted stream to another receiver from the at least one additional receiver.

17. The method according to claim 15, wherein the at least one additional receiver outputs an upstream side band stream from the additional decryption engine to the first receiver.

18. The method according to claim 17, wherein the first receiver combines an upstream side band stream from the decryption engine of the first receiver with the incoming upstream side band stream from the at least one additional receiver into a combined upstream side band stream, the combined upstream side band stream outputted to the transmitter.

19. The method according to claim 15, wherein the plurality of encryption engines output downstream side band streams, one of the downstream side band streams being transmitted to the decryption engine of the first receiver.

20. The method according to claim 19, wherein another one of the downstream side band streams is transmitted to the additional decryption engine of the at least one additional receiver.

21. The method according to claim 15, further comprising:
configuring, by a controller, each of the plurality of encryption and decryption engines to use a respective single one of the plurality of keys; and
selectively enabling and disabling, by the controller, operation of each of the plurality of encryption and decryption engines.

22. A system for transmitting multiple encrypted streams, the system comprising:
a transmitter device including:
a plurality of encryption engines to encrypt a plurality of audio/video streams using a plurality of keys, each encryption engine fully encrypting a different respective single one of the plurality of audio/video streams;
a framer to receive the plurality of encrypted audio/video streams from the plurality of encryption engines and combine the plurality of encrypted audio/video streams into a merged encrypted stream; and
an output buffer to output the merged encrypted stream onto a first cable portion; and
a transceiver device including:
an input buffer to receive the merged encrypted stream from the first cable portion;
a deframer to select and output only a single one of the plurality of encrypted audio/video streams from the merged encrypted stream;
a single decryption engine to decrypt only the selected single one of the plurality of encrypted audio/video streams for display; and
an output buffer to output the merged encrypted stream onto a second cable portion.

23. The transmitter device according to claim 22, further comprising a controller to generate and send control signals to:
configure each of the plurality of encryption engines to use a respective single one of the plurality of keys; and
selectively enable and disable operation of each of the plurality of encryption engines.

24. A transceiver device for receiving and transmitting multiple encrypted streams, the transceiver device comprising:
an input buffer to receive a merged encrypted stream from a first cable portion;
a deframer to select and output only a single one of a plurality of encrypted audio/video streams from the merged encrypted stream, wherein the plurality of encrypted audio/video streams represent a plurality of different audio/video streams, each fully encrypted using a different respective one of a plurality of encryption keys;
a single decryption engine to decrypt only the selected single one of the plurality of encrypted audio/video streams for display; and
an output buffer to output the merged encrypted stream onto a second cable portion.

25. The transceiver device according to claim 24, further comprising a controller to generate and send control signals to:
configure the decryption engine to use a respective single one of the plurality of keys; and
selectively enable and disable operation of the decryption engine.

26. A method for receiving and transmitting multiple encrypted streams, the method comprising:
receiving, at an input buffer of a transceiver device, a merged encrypted stream from a first cable portion;
selecting and outputting, by a deframer of the transceiver device, only a single one of a plurality of encrypted audio/video streams from the merged encrypted stream, wherein the plurality of encrypted audio/video streams represent a plurality of different audio/video streams, each fully encrypted using a different respective one of a plurality of encryption keys;
decrypting, by a decryption engine of the transceiver device, only the selected single one of the plurality of encrypted audio/video streams for display; and
outputting, by an output buffer of the transceiver device, the merged encrypted stream onto a second cable portion.

27. The method according to claim 26, further comprising:
configuring, by a controller of the transceiver device, the decryption engine to use a respective single one of the plurality of keys; and
selectively enabling and disabling, by the controller, operation of the decryption engine.

* * * * *